(12) United States Patent
Lee

(10) Patent No.: US 7,022,058 B2
(45) Date of Patent: Apr. 4, 2006

(54) METHOD FOR PREPARING AIR CHANNEL-EQUIPPED FILM FOR USE IN VACUUM PACKAGE

(75) Inventor: Kyul-Joo Lee, Kyonggido (KR)

(73) Assignee: Tilia International, Inc., San Francisco, CA (US)

( * ) Notice: Subject to any disclaimer, the term of this patent is extended or adjusted under 35 U.S.C. 154(b) by 321 days.

(21) Appl. No.: 10/169,485

(22) PCT Filed: Feb. 21, 2002

(86) PCT No.: PCT/KR02/00283

§ 371 (c)(1),
(2), (4) Date: Jun. 26, 2002

(87) PCT Pub. No.: WO02/074522

PCT Pub. Date: Sep. 26, 2002

(65) Prior Publication Data

US 2003/0155269 A1     Aug. 21, 2003

(30) Foreign Application Priority Data

Feb. 21, 2001 (KR) ................... 2001-8724
Feb. 20, 2002 (KR) ................... 2002-9064

(51) Int. Cl.
*B31B 1/60* (2006.01)

(52) U.S. Cl. ..................... 493/210; 493/374

(58) Field of Classification Search ............ 493/210, 493/211, 374, 379; 156/77, 80, 140
See application file for complete search history.

(56) References Cited

U.S. PATENT DOCUMENTS

| | | | |
|---|---|---|---|
| 274,447 A | 3/1883 | Kennish | |
| 1,938,593 A | 12/1933 | Jarrier | |
| 2,085,766 A | 7/1937 | Potdevin et al. | |
| 2,105,376 A | 1/1938 | Scott | |
| 2,265,075 A | 12/1941 | Knuetter | |
| 2,387,812 A | 10/1945 | Sonneborn et al. | |
| 2,429,482 A | 10/1947 | Munters | |
| 2,480,316 A | 8/1949 | Blair et al. | |
| 2,607,712 A | 8/1952 | Sturken | |

(Continued)

FOREIGN PATENT DOCUMENTS

EP          0723915 A1      7/1996

(Continued)

OTHER PUBLICATIONS

EPO International Search Report, Jun. 12, 2002.

*Primary Examiner*—Eugene Kim
(74) *Attorney, Agent, or Firm*—Perkins Coie LLP

(57) ABSTRACT

Disclosed is a method for preparing an air channel-equipped film for use in vacuum packages, which comprises the step of providing a gas-impermeable base, along with a melt-extruded heat-sealable resin, to a laminating unit consisting of a laminating roll and a cooling roll, to form a heat-sealable resin layer on the gas-impermeable base, characterized in that the heat-sealable resin is molded and quenched in such a way that a plurality of protrusions, corresponding to a plurality of grooves formed in a predetermined pattern on the circumferential surface of the cooling roll, are formed on the molded heat-sealable resin layer, defining channels for the evacuation of air therebetween. The method is simple because of its ability to form air channels without the aid of additional embossing techniques, as well as being economically favorable owing to the employment of no embossing molds.

5 Claims, 10 Drawing Sheets

U.S. PATENT DOCUMENTS

| | | |
|---|---|---|
| 2,609,314 A | 9/1952 | Engel et al. |
| 2,633,442 A | 3/1953 | Caldwell |
| 2,642,372 A | 6/1953 | Chittick |
| 2,670,501 A | 3/1954 | Michiels |
| 2,690,206 A | 9/1954 | Mueller |
| 2,695,741 A | 11/1954 | Haley |
| 2,759,866 A | 8/1956 | Seymour |
| 2,772,712 A | 12/1956 | Post |
| 2,776,452 A | 1/1957 | Chavannes |
| 2,778,171 A | 1/1957 | Taunton |
| 2,778,173 A * | 1/1957 | Taunton .................. 53/427 |
| 2,789,609 A | 4/1957 | Post |
| 2,821,338 A | 1/1958 | Metzger |
| 2,856,323 A | 10/1958 | Gordon |
| 2,858,247 A | 10/1958 | De Swart |
| 2,913,030 A | 11/1959 | Fisher |
| 2,916,411 A | 12/1959 | Villoresi |
| 2,960,144 A | 11/1960 | Graf |
| 3,026,231 A | 3/1962 | Chavannes |
| 3,060,985 A | 10/1962 | Vance et al. |
| 3,077,262 A | 2/1963 | Gaste |
| 3,077,428 A | 2/1963 | Heuser et al. |
| 3,098,563 A | 7/1963 | Skees |
| 3,102,676 A | 9/1963 | Danelli et al. |
| 3,113,715 A | 12/1963 | Pangrac |
| 3,135,411 A | 6/1964 | Osborne |
| 3,141,221 A | 7/1964 | Faulis, Jr. |
| 3,142,599 A | 7/1964 | Chavannes |
| 3,149,772 A | 9/1964 | Olsson |
| 3,160,323 A | 12/1964 | Weisberg |
| 3,224,574 A | 12/1965 | McConnell et al. |
| 3,237,844 A | 3/1966 | Hughes |
| 3,251,463 A | 5/1966 | Bodet |
| 3,325,084 A | 6/1967 | Ausnit |
| 3,334,805 A | 8/1967 | Halbach |
| 3,381,887 A | 5/1968 | Lowry |
| 3,411,698 A | 11/1968 | Reynolds |
| 3,423,231 A | 1/1969 | Lutzmann |
| 3,516,217 A | 6/1970 | Gildersleeve |
| 3,533,548 A | 10/1970 | Taterka |
| 3,565,147 A | 2/1971 | Ausnit |
| 3,575,781 A | 4/1971 | Pezely |
| 3,595,467 A | 7/1971 | Goglio |
| 3,595,722 A | 7/1971 | Dawbarn |
| 3,595,740 A | 7/1971 | Gerow |
| 3,600,267 A | 8/1971 | McFedries, Jr. |
| 3,661,677 A | 5/1972 | Wang |
| 3,785,111 A | 1/1974 | Pike |
| 3,799,427 A | 3/1974 | Goglio |
| 3,809,217 A | 5/1974 | Harrison |
| 3,833,166 A | 9/1974 | Murray |
| 3,895,153 A | 7/1975 | Johnston et al. |
| 3,908,070 A | 9/1975 | Marzolf |
| 3,937,395 A | 2/1976 | Lawes |
| 3,958,391 A | 5/1976 | Kujubu |
| 3,958,693 A | 5/1976 | Greene |
| 3,980,226 A | 9/1976 | Franz |
| 3,998,499 A | 12/1976 | Chiarotto |
| 4,018,253 A | 4/1977 | Kaufman |
| 4,066,167 A | 1/1978 | Hanna et al. |
| 4,098,404 A | 7/1978 | Markert |
| 4,104,404 A | 8/1978 | Bieler et al. |
| 4,105,491 A | 8/1978 | Haase et al. |
| 4,155,453 A | 5/1979 | Ono |
| 4,164,111 A | 8/1979 | Di Bernardo |
| 4,179,862 A | 12/1979 | Landolt |
| 4,186,786 A | 2/1980 | Kirkpatrick |
| 4,212,337 A | 7/1980 | Kamp |
| 4,215,725 A | 8/1980 | Callet et al. |
| 4,295,566 A | 10/1981 | Vincek |
| 4,310,118 A | 1/1982 | Kisida et al. |
| 4,340,558 A * | 7/1982 | Hendrickson .............. 264/151 |
| 4,370,187 A | 1/1983 | Katagiri et al. |
| 4,372,921 A | 2/1983 | Sanderson et al. |
| 4,407,879 A * | 10/1983 | Smart .................... 428/141 |
| 4,449,243 A | 5/1984 | Platel |
| 4,486,923 A | 12/1984 | Briggs |
| 4,532,652 A | 7/1985 | Herrington |
| 4,551,379 A | 11/1985 | Kerr |
| 4,569,712 A | 2/1986 | Shibano et al. |
| 4,575,990 A | 3/1986 | Von Bismarck |
| 4,576,283 A | 3/1986 | Fafournox |
| 4,576,285 A | 3/1986 | Goglio |
| 4,579,756 A | 4/1986 | Edgel |
| 4,583,347 A | 4/1986 | Nielsen |
| 4,622,036 A * | 11/1986 | Goodrum ................. 604/367 |
| 4,658,434 A | 4/1987 | Murray |
| 4,669,124 A | 5/1987 | Kimura |
| 4,672,684 A | 6/1987 | Barnes et al. |
| 4,683,702 A | 8/1987 | Vis |
| 4,705,174 A | 11/1987 | Goglio |
| 4,712,574 A | 12/1987 | Perrott |
| 4,747,702 A | 5/1988 | Scheibner |
| 4,756,422 A | 7/1988 | Kristen |
| 4,756,629 A | 7/1988 | Tilman et al. |
| 4,778,282 A | 10/1988 | Borchardt et al. |
| 4,786,285 A | 11/1988 | Jambor |
| 4,812,056 A | 3/1989 | Zieke |
| 4,834,554 A | 5/1989 | Stetler, Jr. et al. |
| 4,841,603 A | 6/1989 | Ragni |
| 4,871,264 A | 10/1989 | Robbins, III et al. |
| 4,877,334 A | 10/1989 | Cope |
| 4,887,912 A | 12/1989 | Stumpf |
| 4,890,637 A | 1/1990 | Lamparter |
| 4,892,414 A | 1/1990 | Ausnit |
| 4,903,718 A | 2/1990 | Sullivan |
| 4,906,108 A | 3/1990 | Herrington et al. |
| 4,913,561 A | 4/1990 | Beer |
| 4,917,506 A | 4/1990 | Scheibner |
| 4,917,844 A | 4/1990 | Komai et al. |
| 4,941,310 A | 7/1990 | Kristen |
| 4,953,708 A | 9/1990 | Beer et al. |
| 4,973,171 A | 11/1990 | Bullard |
| 5,006,056 A | 4/1991 | Mainstone et al. |
| 5,040,904 A | 8/1991 | Cornwell |
| 5,048,269 A | 9/1991 | Deni |
| D320,549 S | 10/1991 | McKellar et al. |
| 5,053,091 A | 10/1991 | Giljam et al. |
| 5,063,639 A | 11/1991 | Boeckmann et al. |
| 5,080,155 A | 1/1992 | Crozier |
| 5,097,956 A | 3/1992 | Davis |
| 5,098,497 A | 3/1992 | Brinley |
| 5,106,688 A | 4/1992 | Bradfute et al. |
| 5,111,838 A | 5/1992 | Langston |
| 5,116,444 A | 5/1992 | Fox |
| 5,121,590 A | 6/1992 | Scanlan |
| 5,142,970 A | 9/1992 | ErkenBrack |
| 5,203,458 A | 4/1993 | Cornwell |
| 5,209,264 A | 5/1993 | Koyanagi |
| D338,399 S | 8/1993 | Conte, Jr. |
| 5,240,112 A | 8/1993 | Newburger |
| 5,242,516 A | 9/1993 | Custer et al. |
| 5,246,114 A | 9/1993 | Underwood |
| 5,252,379 A | 10/1993 | Kuribayashi et al. |
| 5,332,095 A | 7/1994 | Wu |
| 5,333,736 A | 8/1994 | Kawamura |
| 5,339,959 A | 8/1994 | Cornwell |
| 5,352,323 A | 10/1994 | Chi |
| 5,362,351 A | 11/1994 | Karszes |
| 5,368,394 A | 11/1994 | Scott et al. |
| 5,371,925 A | 12/1994 | Sawatsky |
| 5,373,965 A | 12/1994 | Halm et al. |
| 5,397,182 A | 3/1995 | Gaible et al. |
| 5,402,906 A | 4/1995 | Brown et al. |

| | | | | | | |
|---|---|---|---|---|---|---|
| RE34,929 E | 5/1995 | Kristen | | D425,786 S | 5/2000 | Voller |
| D360,578 S | 7/1995 | Dees | | 6,059,457 A | 5/2000 | Sprehe et al. |
| 5,445,275 A | 8/1995 | Curley et al. | | 6,070,728 A | 6/2000 | Overby et al. |
| 5,450,963 A | 9/1995 | Carson | | 6,074,677 A | 6/2000 | Croft |
| 5,480,030 A | 1/1996 | Sweeney et al. | | 6,076,967 A | 6/2000 | Beaudette |
| 5,526,843 A | 6/1996 | Wolf et al. | | 6,077,373 A | 6/2000 | Fletcher et al. |
| 5,540,500 A | 7/1996 | Tanaka | | 6,089,271 A | 7/2000 | Tani |
| 5,542,902 A | 8/1996 | Richison et al. | | 6,105,821 A | 8/2000 | Christine et al. |
| 5,544,752 A | 8/1996 | Cox | | 6,116,781 A | 9/2000 | Skeens |
| 5,549,944 A | 8/1996 | Abate | | 6,161,716 A | 12/2000 | Oberhofer et al. |
| 5,551,213 A | 9/1996 | Koelsch et al. | | 6,164,826 A | 12/2000 | Petkovsek |
| 5,554,423 A | 9/1996 | Abate | | 6,202,849 B1 | 3/2001 | Graham |
| 5,584,409 A | 12/1996 | Chemberlen | | 6,220,702 B1 | 4/2001 | Nakamura et al. |
| 5,592,697 A | 1/1997 | Young | | 6,224,528 B1 | 5/2001 | Bell |
| 5,620,098 A | 4/1997 | Boos et al. | | 6,227,706 B1 | 5/2001 | Tran |
| 5,638,664 A | 6/1997 | Levsen et al. | | 6,231,234 B1 | 5/2001 | Gebhardt |
| 5,655,273 A | 8/1997 | Tomic et al. | | 6,231,236 B1 | 5/2001 | Tilman |
| 5,656,209 A | 8/1997 | Benz et al. | | 6,274,181 B1 | 8/2001 | Richison et al. |
| 5,665,456 A | 9/1997 | Kannankeril et al. | | 6,319,456 B1 * | 11/2001 | Gilbert et al. ............... 264/519 |
| 5,689,866 A | 11/1997 | Kasai et al. | | D451,542 S | 12/2001 | Ishizawa et al. |
| 5,699,936 A | 12/1997 | Sakamoto | | 6,357,915 B1 | 3/2002 | Anderson |
| 5,701,996 A | 12/1997 | Goto et al. | | 6,402,873 B1 | 6/2002 | Fujii et al. |
| 5,709,467 A | 1/1998 | Galliano, II | | 6,408,872 B1 | 6/2002 | Skeens et al. |
| 5,735,395 A | 4/1998 | Lo | | 6,423,356 B1 | 7/2002 | Richison et al. |
| 5,749,493 A | 5/1998 | Boone et al. | | 6,520,071 B1 | 2/2003 | Lanza |
| 5,765,608 A | 6/1998 | Kristen | | 6,568,931 B1 * | 5/2003 | Fujii et al. .................. 425/194 |
| 5,772,034 A | 6/1998 | Lin | | 6,737,008 B1 * | 5/2004 | Gilbert et al. ............... 264/553 |
| 5,812,188 A | 9/1998 | Adair | | 2001/0023572 A1 | 9/2001 | Savage et al. |
| 5,829,884 A | 11/1998 | Yeager | | 2004/0000501 A1 | 1/2004 | Shah et al. |
| 5,839,582 A | 11/1998 | Strong et al. | | 2004/0000502 A1 | 1/2004 | Shah et al. |
| 5,873,217 A | 2/1999 | Smith | | 2004/0000503 A1 | 1/2004 | Shah et al. |
| 5,874,155 A | 2/1999 | Gehrke et al. | | 2004/0007494 A1 | 1/2004 | Popeil et al. |
| 5,881,881 A | 3/1999 | Carrington | | | | |
| 5,893,822 A | 4/1999 | Deni et al. | | FOREIGN PATENT DOCUMENTS | | |
| 5,898,113 A | 4/1999 | Vecere | | EP | 0 836 927 A1 | 4/1998 |
| 5,908,245 A | 6/1999 | Bost et al. | | EP | 1053945 A1 | 11/2000 |
| 5,915,596 A | 6/1999 | Credle, Jr. | | JP | 55-090364 | 7/1980 |
| 5,927,336 A | 7/1999 | Tanaka et al. | | JP | 62-192779 | 8/1987 |
| 5,928,762 A | 7/1999 | Aizawa et al. | | JP | 07/299865 | 11/1995 |
| D413,258 S | 8/1999 | Voller | | JP | 08-009740 | 4/1996 |
| 5,931,189 A | 8/1999 | Sweeney et al. | | JP | 09-131846 | 5/1997 |
| 5,941,421 A | 8/1999 | Overman et al. | | JP | 09-252919 | 9/1997 |
| 5,941,643 A | 8/1999 | Linkiewicz | | JP | 10-034760 | 2/1998 |
| 5,954,196 A | 9/1999 | Lin | | JP | 10-138377 | 5/1998 |
| 5,957,831 A | 9/1999 | Adair | | JP | 10-180846 | 7/1998 |
| 5,971,613 A | 10/1999 | Bell | | JP | 11-077903 | 3/1999 |
| 5,996,800 A | 12/1999 | Pratt | | JP | 11-15142 | 4/1999 |
| 6,021,624 A | 2/2000 | Richison et al. | | JP | 11-254631 | 9/1999 |
| 6,023,914 A | 2/2000 | Richison et al. | | JP | 2000-015767 | 1/2000 |
| 6,029,810 A | 2/2000 | Chen | | JP | 2000-218746 | 8/2000 |
| 6,030,652 A | 2/2000 | Hanus | | KR | UT 248033 | 5/1995 |
| 6,035,769 A | 3/2000 | Nomura et al. | | WO | WO00/71422 | 11/2000 |
| 6,039,182 A | 3/2000 | Light | | WO | WO 02/28577 A2 | 4/2002 |
| 6,045,006 A | 4/2000 | Fraxier et al. | | | | |
| 6,045,264 A | 4/2000 | Miniea | | * cited by examiner | | |
| 6,053,606 A | 4/2000 | Yamaguchi et al. | | | | |

METHOD FOR PREPARING AIR CHANNEL-EQUIPPED FILM FOR USE IN VACUUM PACKAGE

CROSS REFERENCE

This application is a 371 of PCT/KR02/00283 which was filed on Feb. 21, 2002. This application also claims priority under 35 U.S.C. § 365(b) to Korean patent application 2001-8724, filed Feb. 21, 2001, and 2002-9064, filed Feb. 20, 2002.

TECHNICAL FIELD

The present invention relates to a method for preparing an air channel-equipped film for use in vacuum packages. More specifically, the present invention is directed to a method for preparing an air channel-equipped film, in which a heat-sealable resin layer having channels for the evacuation of air formed in a pattern defined by grooves on a cooling roll is formed on a gas-impermeable base layer, and a bag for use in vacuum packages produced by use of such films.

PRIOR ART

In various countries including the United States, a method of preserving perishable foods such as meats or processed meats for a long term has been widely used, comprising the steps of stuffing foods into a plastic bag capable of maintaining a vacuum therein, evacuating air from the bag by use of an air pump or another vacuum processing machine, and tightly sealing the bag.

With reference to FIG. 1, a schematic perspective view of the conventional bag for use in vacuum packages is illustrated. The conventional bag comprises a main body 110 with both sheets 111 and 112 consisting of a plastic-based film; a sealed part 120 in which a lower, a left, and a right edge of the main body 110 are heat-sealed so as to form an inner space for receiving perishable products such as foods; and an unsealed part 130 provided at an upper edge of the main body 110, through which perishable products are stuffed into the main body 110 and air is evacuated from the inside of the main body 110. At this time, the main body 110 is generally made of a thermoplastic polyethylene resin which is melted by heat and is harmless to a human body.

After foods are stuffed through the unsealed part 130 into the bag and air is evacuated from the inside of the bag by use of an air pump or another vacuum processing machine, the unsealed part is heated to a predetermined temperature and pressed to seal the bag.

However, the bag as above is disadvantageous in that both sheets 111 and 112 of the main body 110 are quickly adhered to each other while some of air is discharged from the bag when perishable products are stuffed into the bag and air in the bag is evacuated by use of a vacuum processing machine, and thus air remaining in the lower part of the bag may not evacuated.

To avoid the above disadvantage, a technology for forming air channels by processing the conventional sheet with the aid of embossing techniques was developed. According to the technology, air channels are formed on one sheet or both sheets of a film constituting the main body, and air is evacuated along the air channel from the bag during the evacuation of air in the bag by the vacuum processing machine, thereby air existing in the lower par of the bag is easily evacuated from the bag.

U.S. Pat. No. 2,778,173 discloses a method of producing airtight packages using the above technology. According to this method, an evacuating opening is formed on a first sheet, and a second sheet is laid overlapped with the first sheet in such a way that the second sheet precisely overlaps the first sheet. At this time, a plurality of spacing projections are formed on at least one of the two sheets, thereby channels for the movement of air, connected to the openings, are formed. In addition, the projections may take shapes of pyramid and hemisphere, and are formed by pressing the film constituting the sheet using heated female and male dies or various tools. Alternatively, the channels are formed by interposing a strip with projections between the first sheet and the second sheet.

According to this method, projections in a blank of flexible, fluid-tight sheet material to provide channels between the projections, and one sheet portion of the blank is folded over another sheet portion of the blank with the projections between the sheet portions and with the peripheral edges of the sheet portions contacting each other. Then, the contacting peripheral edges are sealed to each other for part of their length to form an envelope having an inlet at the unsealed part of the peripheral edges. A commodity is introduced into the envelope through the inlet and the remainder of the contacting peripheral edges is sealed to each other to close the inlet. Thereafter, an evacuating opening is pierced in a part of the sheet material which communicates with the channels, air is removed from the interior of the envelope through the channels and opening, and the opening is sealed. However, this method is disadvantageous in that two sealing steps are additionally required after the commodity is stuffed into the envelope.

To avoid the above disadvantage, another technology was developed, in which a main body of the conventional bag for use in vacuum packages as shown in FIG. 1 consists of laminated films, and at least one sheet of the main body is embossed by use of an embossing mold.

FIG. 2 is a schematic perspective view of the conventional bag for use in vacuum packages, with its one side being subjected to embossing. In this technology, one film layer 113 of laminated film layers 113 and 114 constituting the main body 110 of the conventional bag for use in vacuum packages as shown in FIG. 2 is embossed to form protrusions 116 and channels 115 defined by the space between protrusions 116, so that air is readily evacuated from the bag.

Such a technology is exemplified in U.S. Pat. No. Re. 34,929. The bag for use in vacuum packages consists of a first panel and a second panel overlapping each other, and panels each having a predetermined thickness are sealed to each other at a lower, a left, and a right edge except an inlet for receiving products. Furthermore, the first and the second panel each consist of a heat-sealable inner layer with a uniform thickness and a gas-impermeable outer layer with a uniform thickness, and a plurality of protrusions are formed in a waffle-shaped pattern on an inner and an outer surface of at least one panel of the first panel and the second panel (refer to FIGS. 6 and 7 in U.S. Pat. No. Re. 34,929). In particular, an embossing pattern is formed on a hot roller, and the laminated film consisting of the gas-impermeable sheet and the heat-sealable sheet is provided to the hot roller and embossed with heating to form channels 115 and protrusions 116. However, when the protrusions and channels are forcibly formed on the film with a predetermined thickness by heat, the contacting portion between the channel and the protrusion is drawn and such a drawn portion of the film becomes thin. Thus, the film may be torn during the embossing, or pinholes may be formed on the film due to re-drawing of the film during forming a vacuum in the bag, and so environmental air flows into the bag. Also, it is necessary to frequently replace the embossing mold with a new one because the film may be damaged due to abrasion of the embossing mold when the embossing mold is used for a long time.

Meanwhile, U.S. Pat. No. 5,554,423 corresponding to EP 0 648 688 B1 discloses a bag for use in vacuum packages using another type of protrusions. According to this patent, a tubular element for forming bags for the vacuum-packing of products comprises a first sheet consisting of a gas-impermeable outer layer and a heat-sealable inner layer and a second sheet consisting of a gas-impermeable outer layer and a heat-sealable inner layer, and the first sheet and the second sheet are adhered to each other at an upper and a lower edge to form a space for receiving perishable products in the bag. In particular, a plurality of heat-sealable strand elements are heat bonded at regular intervals to the inner sheet of any one sheet of the first sheet and the second sheet in such a way that heat-sealable strand elements extend along a length of the tubular element substantially parallel to the upper and lower bonded edges, thereby a space between strand elements acts as a channel for the evacuation of air. In this respect, FIG. 3 schematically illustrates arrangement and heat bonding of a plurality of heat-sealable strand elements on the sheet. According to this patent, a plurality of strand elements 4 extruded from an extrusion head 2 for use in producing strand elements are arranged at regular intervals on the heat-sealable layer of the laminated sheet 1 consisting of the gas-impermeable layer and the heat-sealable layer, and heat bonded to a surface of the heat-sealable layer by use of pressure rollers 3 and 3'. However, this patent is disadvantageous in that separate equipments are required for producing strand elements, and a procedure of heat bonding a plurality of strand elements at regular intervals to the heat-sealable inner layer is very complicated. Other disadvantages are that various shapes of pattern are hard to form, i.e. only strand type channels are formed, and the production of the film with relatively thin thickness is difficult because the strand elements for channels are additionally formed on the heat-sealable inner layer having a predetermined thickness.

Referring to FIG. 4, another method of preparing a film for use in vacuum packages is illustrated, in which channels are directly formed on a heat-sealable inner layer by a co-extrusion process using blowing, and the resulting heat-sealable inner layer is laminated on a gas-impermeable outer layer.

In detail, protrusions 5 are equipped on a co-extrusion ring of the inner layer, and so channels are formed by the protrusions on the film for use in vacuum packages when the film is upwardly blown. However, this method is disadvantageous in that only stripe-shaped channels are formed in itself on the film regardless of the shape of the protrusions, and so various shapes of channels cannot be obtained. Furthermore, there is a limitation in making narrow a space between channels due to characteristics of the co-extrusion process using blowing, so that sheets constituting the main body of the bag are readily adhered to each other during vacuum packing. Thus, the formation of a vacuum in the bag is not sufficient.

Therefore, there remains a need for providing a method of preparing a film for use in vacuum packages, by which more various channel patterns can be achieved with ease compared with the conventional method.

The present inventors have conducted extensive studies into an improved method of preparing a film for use in vacuum packages, resulting in the finding that the film for use in vacuum packages, which is prepared in such a manner that a heat-sealable resin melt-extruded through a nozzle of an extruder and a gas-impermeable base layer are provided between a laminating roll and a cooling roll having grooves formed in a predetermined pattern on a surface thereof, thereby the heat-sealable layer with protrusions and channels for the evacuation of air is formed on the gas-impermeable base layer, can easily overcome the disadvantages encountered in the prior arts.

DISCLOSURE OF THE INVENTION

Therefore, it is an object of the present invention to provide a method of preparing a film for use in vacuum packages, which can effectively prevent pinholes from occurring and can improve an ability to form a vacuum by precisely forming channels.

It is another object of the present invention to provide a method of preparing a film for use in vacuum packages, in which various channel patterns of the film can be readily provided.

It is still another object of the present invention to provide a method of preparing a thin film with excellent physical properties, for use in vacuum packages.

It is yet another object of the present invention to provide a bag for use in vacuum packages produced by use of the film according to the present invention.

Based on the present invention, the above objects of the present invention can be accomplished by a provision of a method for preparing an air channel-equipped film for use in vacuum packages, which comprises the step of providing a gas-impermeable base, along with a melt-extruded heat-sealable resin, to a laminating unit consisting of a laminating roll and a cooling roll, to form a heat-sealable resin layer on the gas-impermeable base, characterized in that the heat-sealable resin is molded and cooled in such a way that a plurality of protrusions, corresponding to a plurality of grooves formed in a predetermined pattern on the circumferential surface of the cooling roll, are formed on the molded heat-sealable resin layer, defining channels for the evacuation of air therebetween.

In addition, according to the present invention, a bag for use in vacuum packages is provided, which comprises a first sheet and a second sheet, one overlapping the other. Each of the two sheets is composed of a laminated film consisting of a gas-impermeable base layer as an outer layer and a heat-sealable resin layer as an inner layer, wherein at least one of the first sheet and the second sheet is a film for use in vacuum packages produced according to the method of this invention. The first sheet and the second sheet are bonded to each other along their lower, left, and right edges so as to form a space for receiving a product to be vacuum packaged therein.

BRIEF DESCRIPTION OF THE DRAWINGS

The above and other objects, features and other advantages of the present invention will be more clearly understood from the following detailed description taken in conjunction with the accompanying drawings, in which.

BEST MODES FOR CARRYING OUT THE INVENTION

Figure 1:
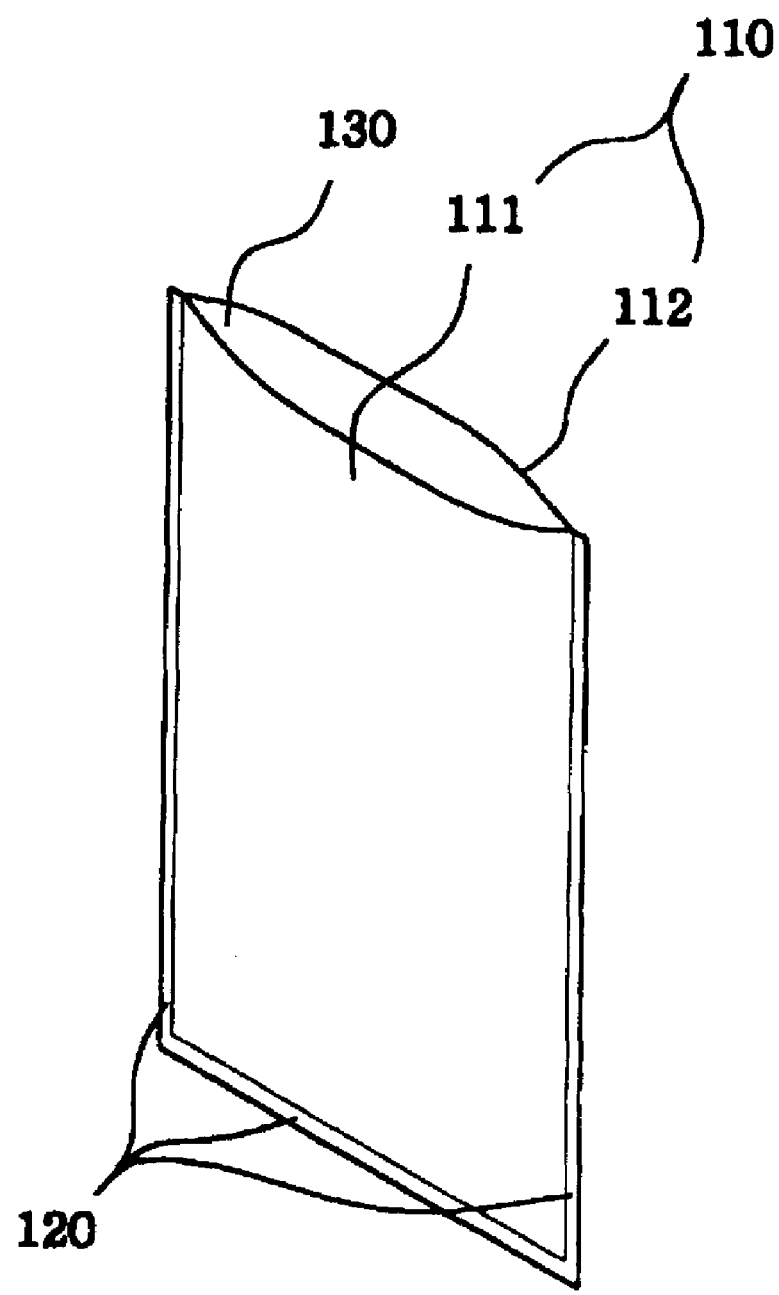
FIG. 1 is a schematic perspective view of the conventional bag for use in vacuum packages.
Figure 2:
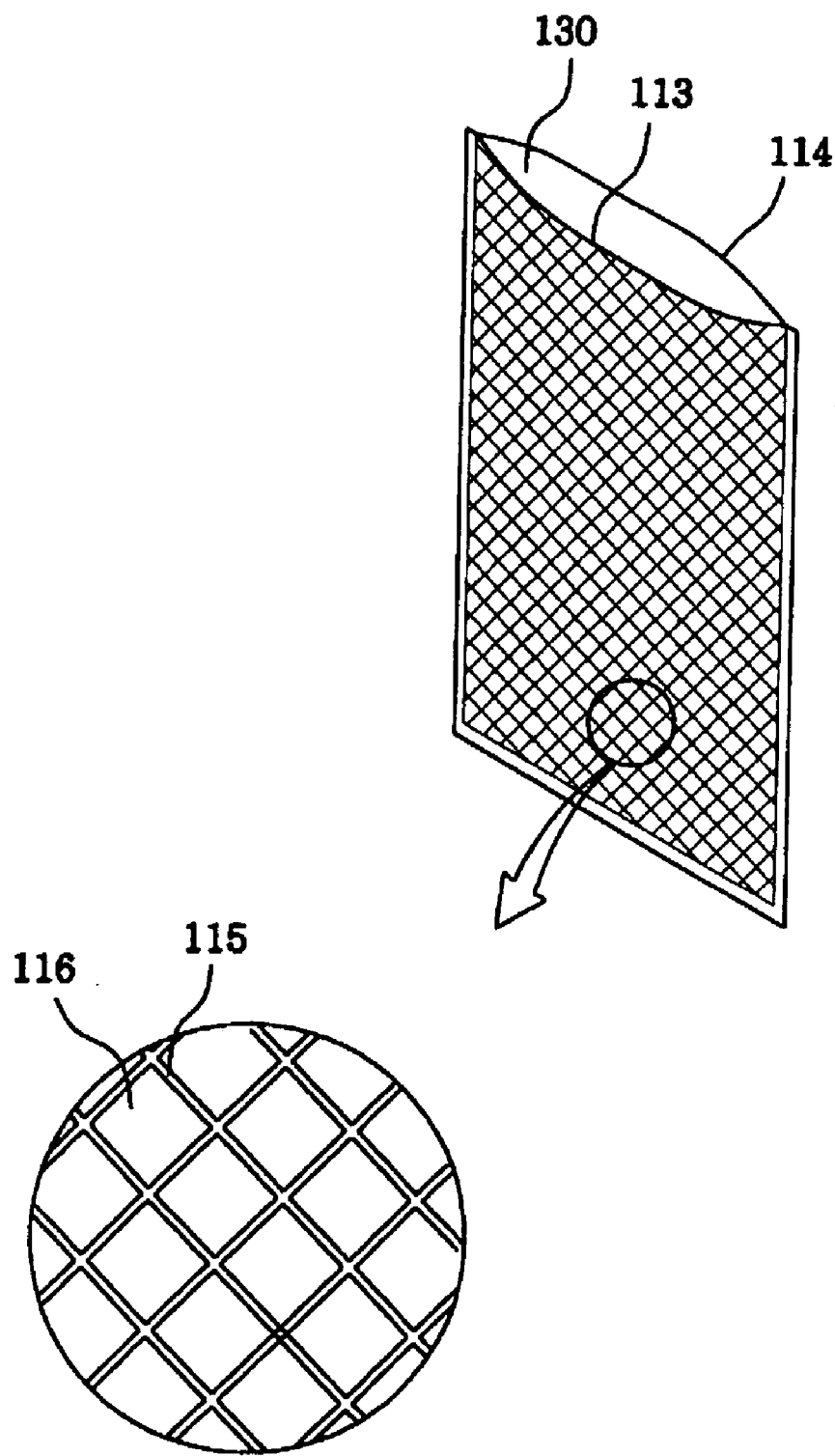
FIG. 2 is a schematic perspective view of the conventional bag for use in vacuum packages, with its one sheet being subjected to embossing.
Figure 3:
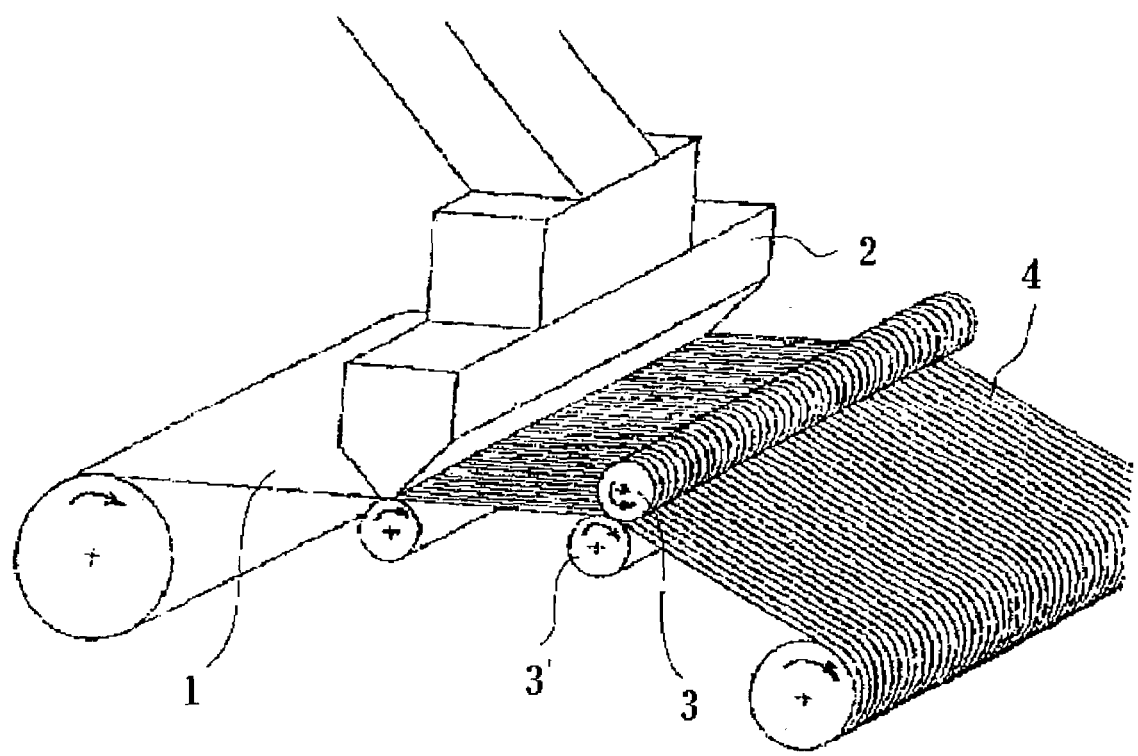
FIG. 3 illustrates heat bonding of a plurality of heat-sealable strand elements onto a surface of a heat-sealable layer of a laminated sheet comprising a gas-impermeable layer and the heat-sealable layer according to the conventional method.
Figure 4:
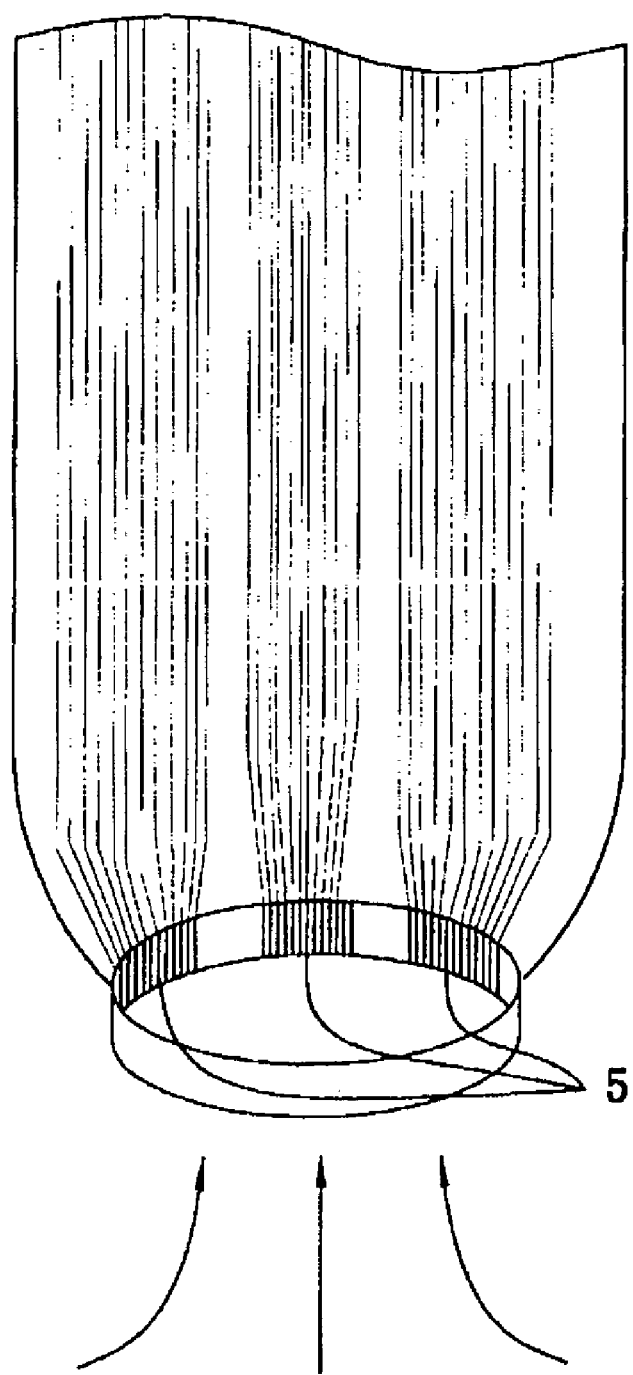
FIG. 4 illustrates a formation of air channels by the conventional co-extrusion process using blowing.
Figure 5:
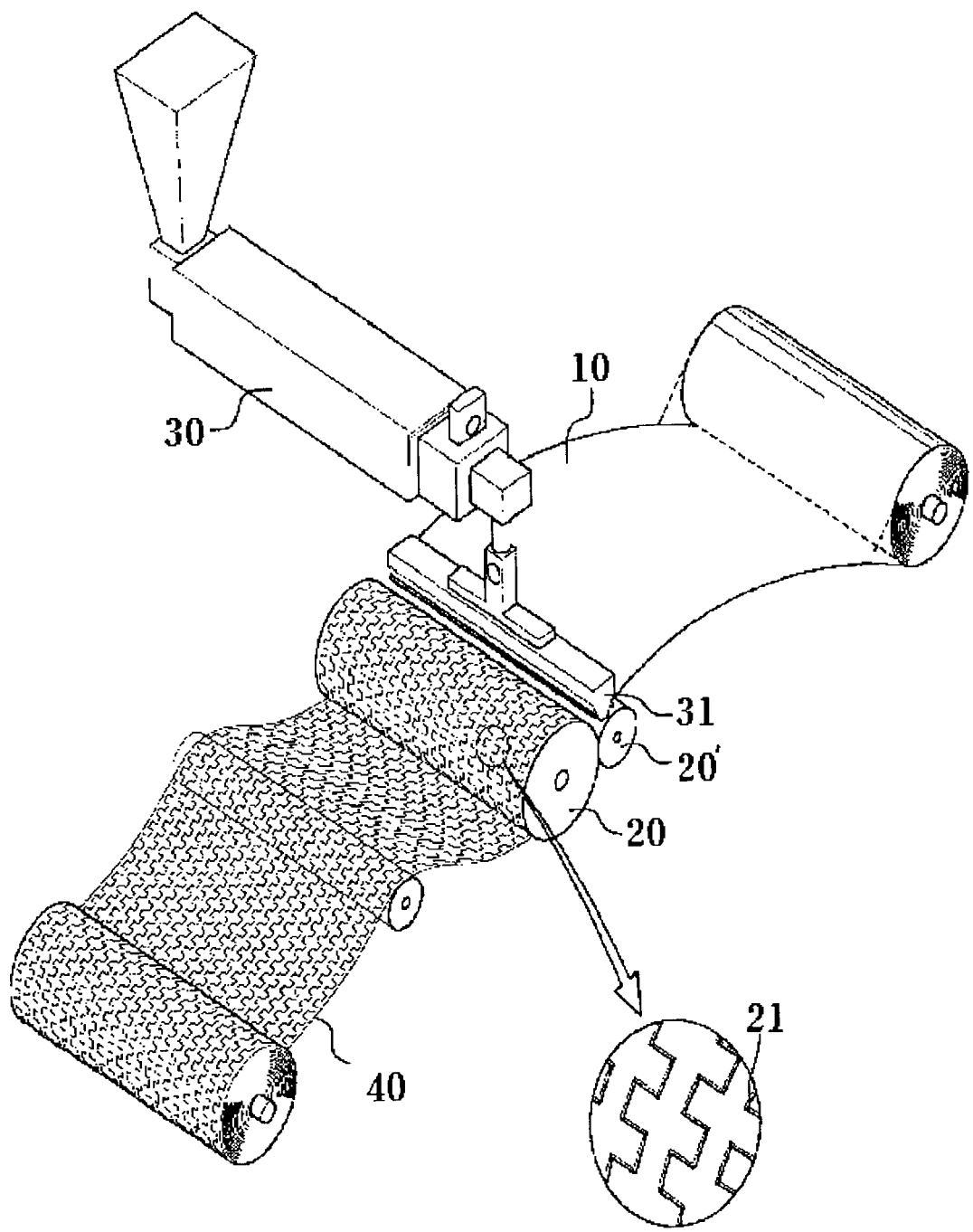
FIG. 5 schematically illustrates a formation of a heat-sealabel resin layer with protrusions and channels for the evacuation of air on a gas-impermeable base layer of the film according to an embodiment of the present invention.

With reference to FIG. 5, formation of a heat-sealable resin layer with protrusions and air channels on a gas-impermeable base layer according to an embodiment of the present invention is schematically illustrated. A laminating roll 20' and a cooling roll 20 constituting a laminating unit are arranged at regular intervals so that the melt-extruded heat-sealable resin layer is stacked on the gas-impermeable base layer while the heat-sealable resin is cooled. Illustrative, but non-limiting examples of materials of the laminating roll and the cooling roll include steel and rubber. The space between the laminating roll and the cooling roll is desirably controlled according to specifications (for example, thickness) of the film for use in vacuum packages. It is preferable to control the temperature of the cooling roll in a range of about −15 to about −10□ so that the melt-extruded resin is cooled. However, the temperature of the cooling roll may be varied according to a laminating condition.

Typically, the cooling roll has a larger diameter than the laminating roll, for example, the diameter of the cooling roll is about 1.5 to about 3 times as large as that of the laminating roll. This range is set forth to illustrate, but is not to be construed to limit the diameter of the cooling roll.

The gas-impermeable base 10 is fed to the nip between the cooling roll 20 and the laminating roll 20' by a feeding means (not shown in FIG. 5). Examples of the gas-impermeable base include polyester, polyamide, and EVOH (ethylene vinyl alcohol), and it is preferable that the gas-impermeable base is made of materials capable of securing mechanical properties when subject to heating in the process of the subsequent vacuum packaging.

The heat-sealable resin is typically made of a thermoplastic resin. After perishable products are stuffed into a bag for use in vacuum packages produced by using a laminated film of the present invention and air which is present in the bag is evacuated, the heat-sealable resin layer of the two sheets in contact with each other while being heated, should be strongly bonded to each other so as to prevent environmental air from penetrating into the bag. In particular, it is preferable that the heat-sealable resin is made of polyethylene (PE) suitable to preserve foods and harmless to a human body.

In FIG. 5, an extruder 30 is positioned in such a way that the melt-extruded heat-sealable resin is layered on the base layer by feeding the extruded heat-sealable resin to the nip between the cooling roll 20 and the laminating roll 20'. The heat-sealable resin is fed through a nozzle 31 of the extruder 30. At this time, the temperature of the melt-extruded heat-sealable resin depends on a kind of the used resin, and preferably, ranges from about 200 to about 250□. Furthermore, the amount of resin to be extruded into the laminating unit depends on the required thickness of the heat-sealable resin layer to be positioned on the base layer.

According to the present invention, a plurality of grooves are formed in a predetermined pattern on the circumferential surface of the cooling roll 20. In FIG. 5, a film for use in vacuum packages according to an embodiment of the present invention is illustrated, in which the heat-sealable resin layer is molded in such a way that protrusions corresponding to illustrative-shaped grooves formed in a predetermined pattern on the circumferential surface of the cooling roll and air channels defined by the space between the protrusions, are formed on the molded heat-sealable resin layer.

As described above, according to the present invention, the heat-sealable resin melt-extruded by the extruder is fed through the nozzle of the extruder, and naturally molded by the grooves of the cooling roll while being cooled. The melt-extruded heat-sealable resin is fed along with the base layer to a laminating unit consisting of the laminating roll and the cooling roll having the grooves formed in a predetermined pattern, and the heat-sealable resin is molded in such a way that a plurality of protrusions, corresponding to the grooves formed on the circumferential surface of the cooling roll, are formed on the molded heat-sealable resin layer, defining channels for the evacuation of air therebetween, thereby the film for use in vacuum packages 40 of the present invention can be prepared. The pattern of the grooves can be formed in desired various shapes such as straight lines and curved lines according to shapes of desired channels, and the shape of the pattern is not limited. Unlike the conventional method adopting a post-embossing treatment, in case that the melt-extruded heat-sealable resin is molded and cooled by use of the grooves according to the present invention, the performance of securing a vacuum by use of the melt-extruded heat-sealable resin is not poor, even though the heat-sealable resin layer is kept thin.

Figure 6:
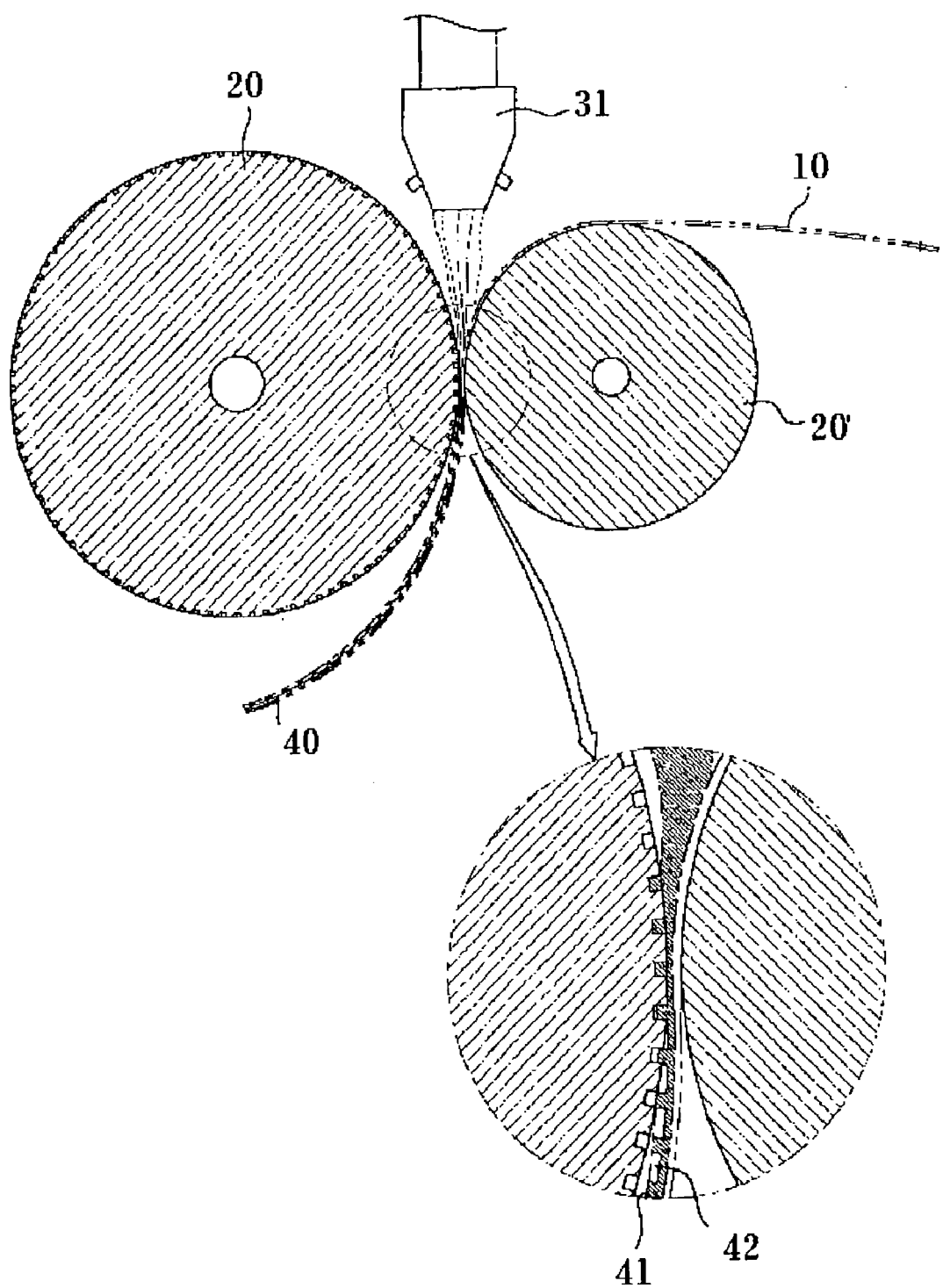
FIG. 6 is a partial expanded view of FIG. 5 illustrating a formation of the heat-sealable resin layer with protrusions and channels for the evacuation of air on the gas-impermeable base layer of the film according to the embodiment of the present invention.
Figure 7:
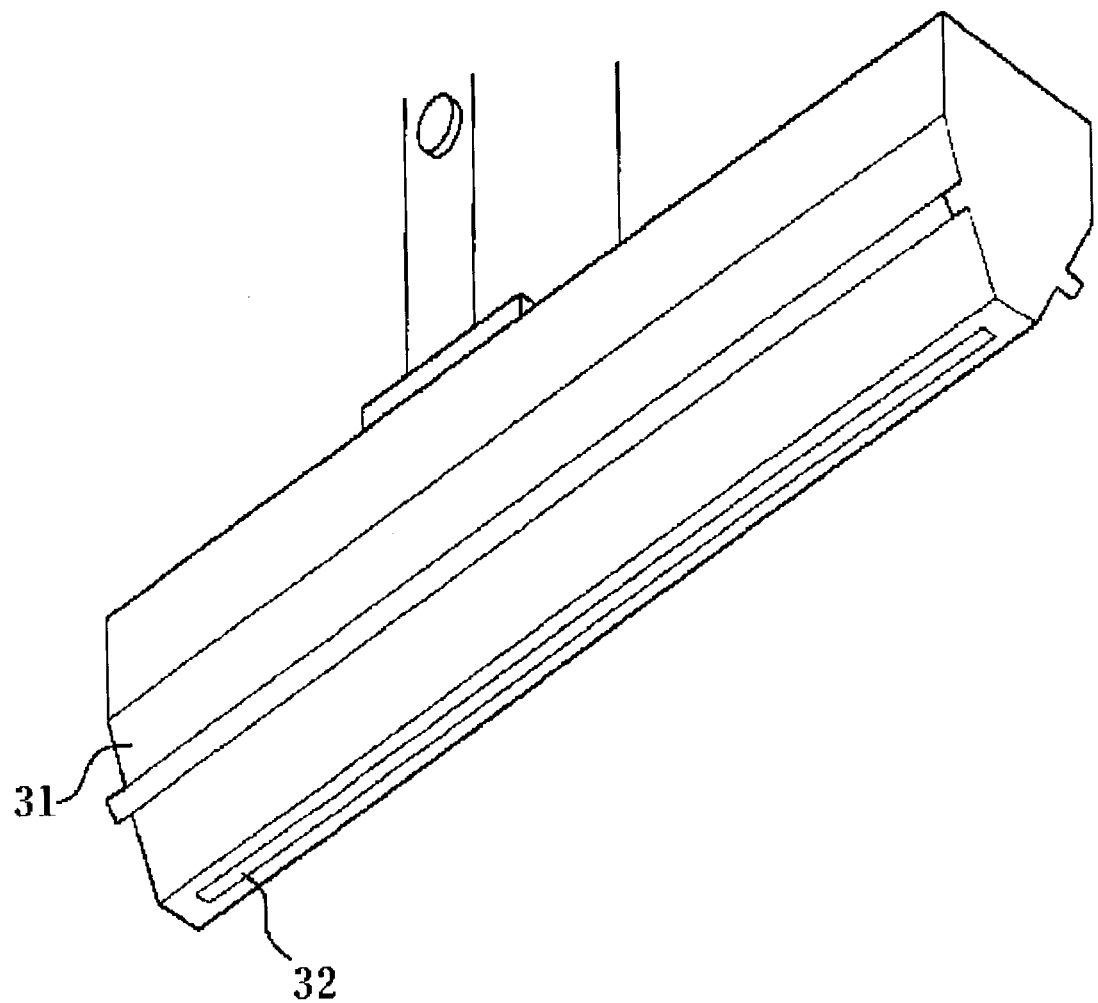
FIG. 7 is a schematic partial perspective view of an extruder shown in FIG. 5.

FIG. 6 is a partial expanded view of FIG. 5 illustrating formation of the heat-sealable resin layer with protrusions and channels for the evacuation of air on the gas-impermeable base layer, and FIG. 7 is a schematic partial perspective view of an extruder shown in FIG. 5. The extruded heat-sealable resin is fed through a nozzle 32 of a nozzle part 31 to the laminating unit, as shown in FIG. 7.

With reference to FIGS. 5 to 7, the base 10 is fed to the nip between the cooling roll 20 and the laminating roll 20' constituting the laminating unit. At this time, a plurality of grooves 21 are formed in a predetermined pattern on the circumferential surface of the cooling roll 20. According to the embodiment illustrated in FIG. 5, each of the grooves is formed in an uneven pattern on the circumferential surface of the cooling roll 20 such that each groove is symmetrical with neighboring grooves.

Moreover, the extruder 30 is positioned between the cooling roll 20 having the grooves 21 with a predetermined pattern and the laminating roll 20', and the heat-sealable resin extruded by the nozzle 32 of the extruder 30 is pressed, along with the base 10, by the cooling roll 20 and the laminating roll 20' constituting the laminating unit to form protrusions corresponding to the grooves of the cooling roll 20 on the heat-sealable resin layer formed on the upper surface of the film 40 for use in vacuum packages. At this time, channels for the evacuation of air are formed on the heat-sealable resin layer at positions between protrusions formed by the grooves 21 of the cooling roll 20.

According to the present invention, the channels may be formed in such a way that a plurality of stripes or crossed stripes are longitudinally extended on the film. The stripe- or cross stripe-shaped channels are set forth to illustrate, but are not to be construed to limit the shape of the channel. Therefore, any shapes of the channels can be applied to a bag for use in vacuum packages of the present invention.

With reference to FIGS. 5 and 6, the grooves are formed in a predetermined uneven pattern on the circumferential surface of the cooling roll, and so a plurality of protrusions are formed on the heat-sealable resin layer and define channels therebetween, which act as channels for the movement of air. Therefore, the shape of the channels of the present invention is determined by the pattern on the cooling roll. On the other hand, the cooling roll having protrusions with the uneven pattern may be employed, so that the resulting channels take an uneven pattern.

Figure 8:
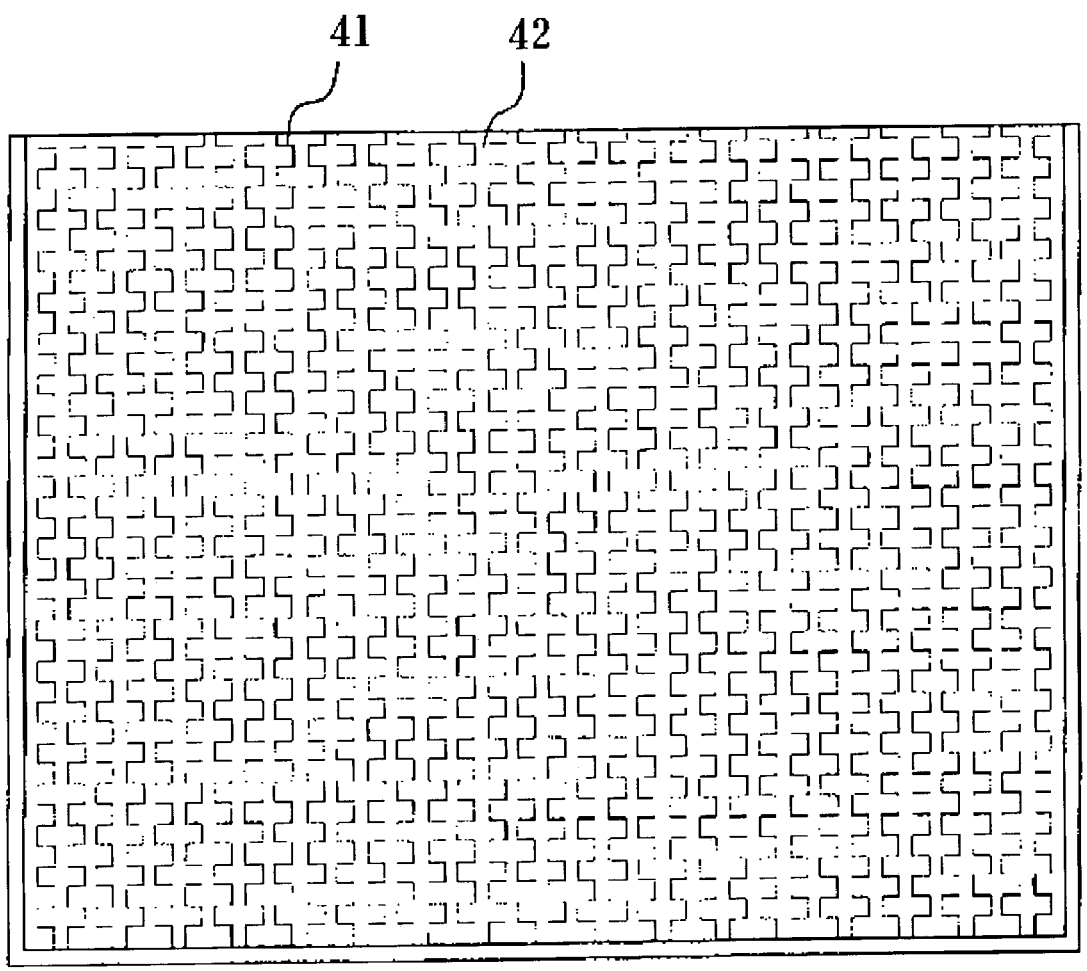
FIG. 8 is a plane view of the film for use in vacuum packages according to an embodiment of the present invention.

Referring to FIG. 8, a plane view of the film for use in vacuum packages according to an embodiment of the present invention is illustrated, in which a plurality of protrusions with the uneven pattern are positioned on the film and channels formed at the gaps between the protrusions are longitudinally extended. Therefore, air remaining in the bag is smoothly evacuated along the channels during the evacuation of air.

Figure 9:
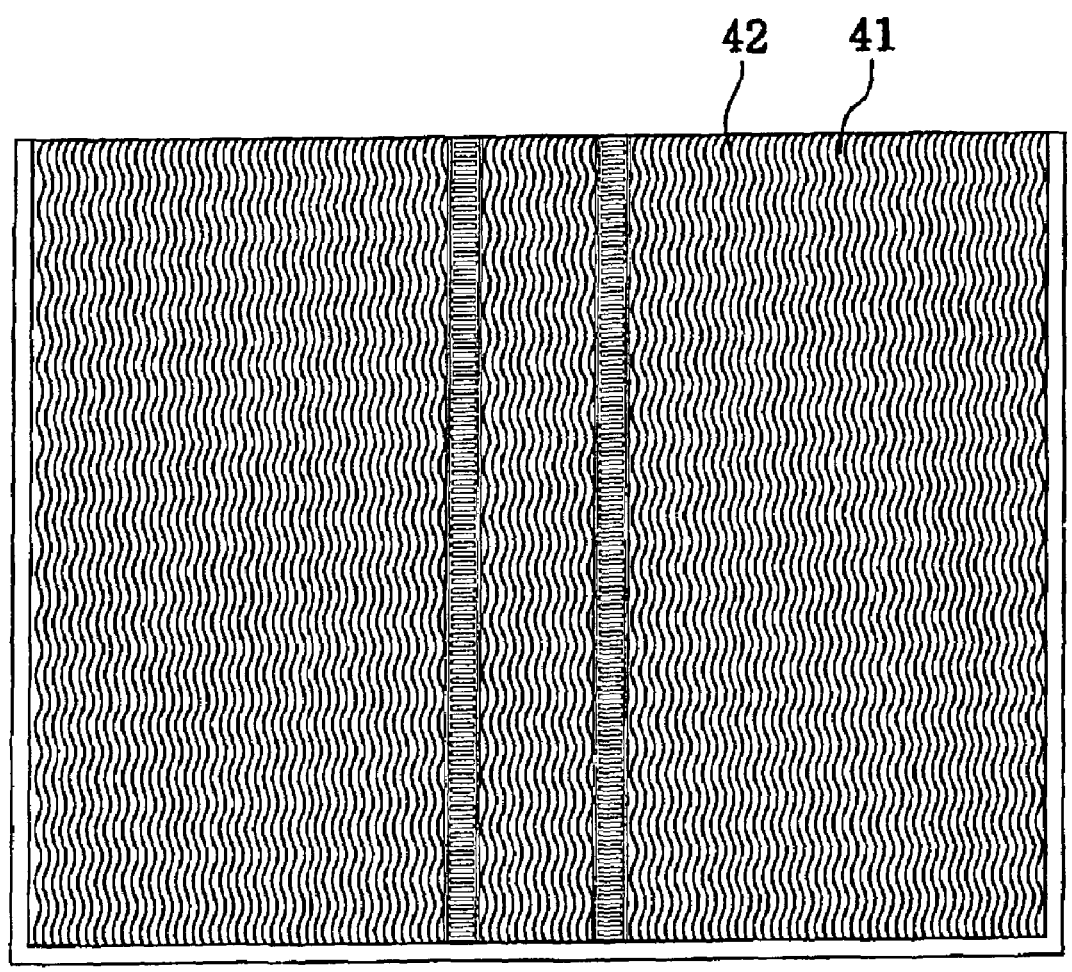
FIG. 9 is a plane view of the film for use in vacuum packages according to another embodiment of the present invention.

Turning now to FIG. 9, a plane view of a film for use in vacuum packages according to another embodiment of the present invention is illustrated. In this embodiment, a plurality of grooves are formed in a wave pattern on the circumferential surface of the cooling roll, and thus channels defined by the gaps between protrusions take the shape of the wave pattern.

Meanwhile, the thickness of each protrusion formed on the heat-sealable resin layer of a laminated film 40 is determined by the depth of grooves 21 formed on the cooling roll 20, and the width of the channel is determined by the interval between the grooves 21. Thus, the shape, width, and thickness of the channels for the evacuation of air, defined by the gaps between protrusions are controlled by changing the specifications for the grooves of the cooling roll according to use of the laminated film.

In the heat-sealable resin layer having such channels, it is typical that each channel ranges from about 40 to about 100 ▫in depth, each protrusion and the base layer are about 150 to about 300 ▫and about 30 to about 200 ▫in thickness, respectively. However, the dimensions of the channel, the protrusion, and the base layer are set forth to illustrate, but are not to be construed to limit the dimensions.

According to the present invention, the base layer may consist of one layer, or two or more layers. When employing a multilayer-structured base layer, it should be understood that a total thickness thereof is also adjusted within the allowable range for the base layer.

Figure 10:
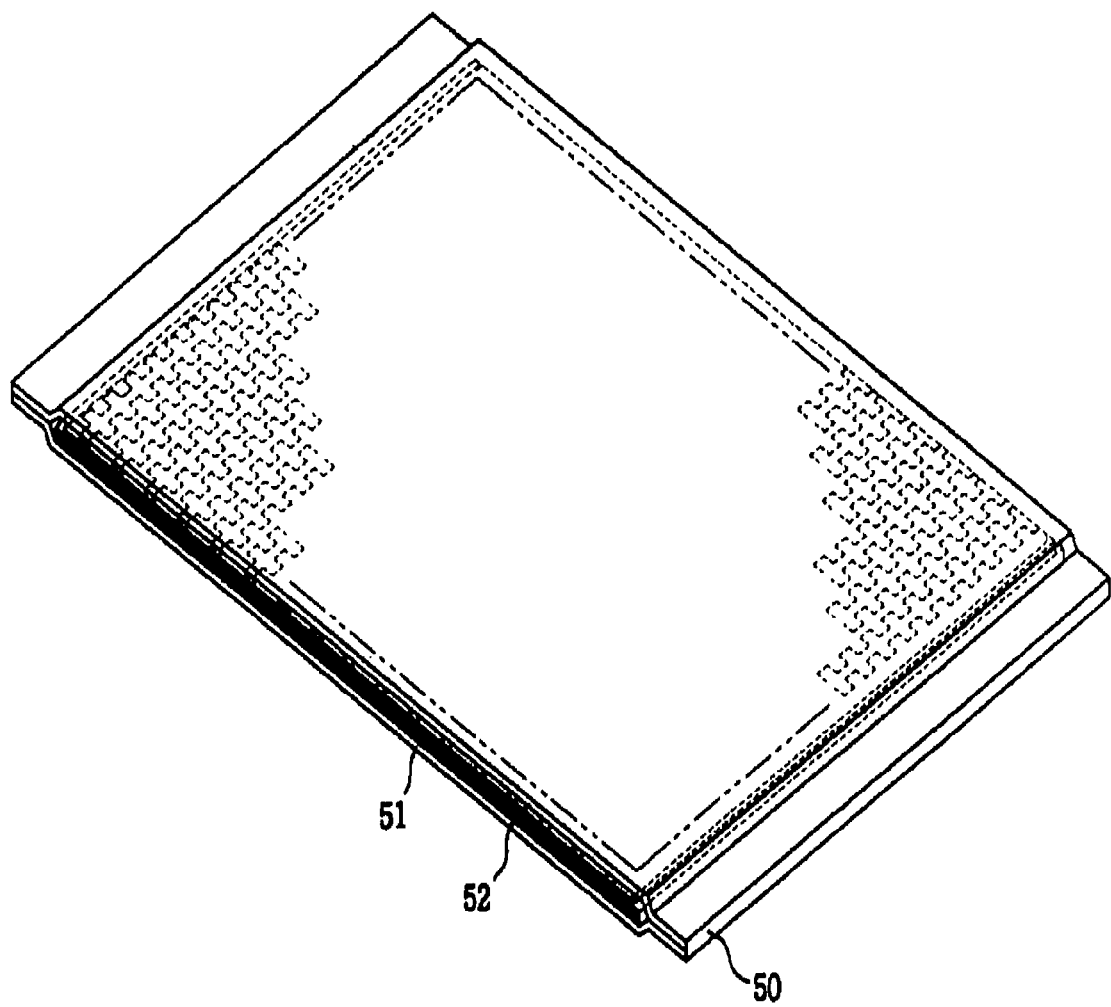
FIG. 10 is a schematic perspective view of a bag for use in vacuum packages according to a further embodiment of the present invention.

With reference to FIG. 10, a bag for use in vacuum packages produced by using the film of the present invention is illustrated, in which the bag 50 for use in vacuum packages consists of a first sheet 51 and a second sheet 52 overlapping each other, and channels are formed on any one of the first sheet 51 and the second sheet 52. At this time, the heat-sealable resin layer and the base layer of each sheet are typically made of the same material as those of the other sheet, but they may also be made of different materials. The heat-sealable resin layer is used as an inner layer and the base layer is used as an outer layer. In addition, lower, left, and right edges of the first and the second sheet are bonded to each other so as to form a space for receiving a product to be vacuum packaged. In case of using the sheet on which channels are not formed, the sheet ranges from about 50 to about 150 ▫in thickness. In FIG. 10, channels with a predetermined pattern are formed on any one of the first sheet and the second sheet. However, it should be understand that a film, in which channels with a predetermined pattern are formed, may be useful as the material of both the first sheet and the second sheet of the bag for use in vacuum packages of this invention. Furthermore, various shapes of bags for use in vacuum packages can be prepared by using the laminated film having channels of the present invention.

A better understanding of the present invention may be obtained by reading the following examples which are set forth to illustrate, but are not to be construed to limit the present invention.

EXAMPLE 1

A polyamide base layer with a width of 1200 mm and a thickness of 75 ▫was fed to a laminating unit at a rate of 80 m/min, as shown in FIG. 5. A laminating roll and a cooling roll made of steel were 250 ▫and 500 ▫in diameter, respectively, and the depth of each groove on the cooling roll was 0.8 mm. The gap between the laminating roll and the cooling roll was 100 ▫, and an extruder was positioned around the nip between the laminating roll and the cooling roll so that a melt-extruded polyethylene resin (CA-110 made by SK Corp.) at 220 ▫ was fed from a nozzle of the extruder to the laminating unit to produce a film for use in vacuum packages. At this time, the temperature of the cooling roll was −12▫. The film for use in vacuum packages thus produced comprised a base layer with a thickness of 75 ▫, protrusions with a thickness of 250 ▫, and channels with a depth of 25 ▫, and was used as a first sheet. A second sheet was produced according to the same procedure as the first sheet, and combined with the first sheet to prepare a bag of 300×400 mm for use in vacuum packages. At this time, the second sheet does not have channels, and the base layer and the heat-sealable resin layer were 75 ▫and 25 ▫in thickness, respectively. Samples were put into the bag for use in vacuum packages, and tightly vacuum-packed by use of a vacuum packing machine (trade name: Foodsaver 550). 100 Samples thus packed were tested for 100 hours, and then the number of bags not maintaining a vacuum state was counted. The results are given in Table 1, below.

COMPARATIVE EXAMPLE 1

Performance of a bag for use in vacuum packages was evaluated according to the same procedure as example 1 except that commercial Foodsaver® made by Tilia Inc. was used as the bag. The results are described in Table 1, below.

COMPARATIVE EXAMPLE 2

Performance of a bag for use in vacuum packages was evaluated according to the same procedure as example 1 except that commercial MAGIC VAC made by Flaemnouva Co. was used as the bag. The results are described in Table 1, below.

TABLE 1

|  | Example 1 | Com. Ex. 1 | Com. Ex. 2 |
|---|---|---|---|
| Number of bags not maintaining vacuum | 0 | 20 | 5 |

From the results of Table 1, it can be seen that the bag for use in vacuum packages according to example 1 of the present invention is much better than the conventional bags for use in vacuum packages in view of maintaining a vacuum state for an extended period.

INDUSTRIAL APPLICABILITY

According to a method of preparing a film for use in vacuum packages of the present invention, as described above, protrusions and channels are naturally formed on a heat-sealable resin layer by grooves of a cooling roll when a heat-sealable resin is layered on a gas-impermeable base. Therefore, the method is simple because of its ability to form air channels without the aid of additional embossing techniques, as well as being economically favorable owing to the employment of no embossing molds. Also, the freedom in patterning the grooves of the cooling roll makes it possible to form versatile air channel patterns and to easily control the intervals between the air channels, with an increase in productivity of about 50% compared to the conventional techniques.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

The invention claimed is:

1. A method for manufacturing a multi-layer film for use in vacuum packaging applications, said multi-layer film including an inner layer having a plurality of grooves which operate to form channels suitable for evacuation of gas when said multi-layer film is used in the creation of a vacuum packaging bag, said method comprising the acts of:

heat-extruding a first material directly onto a spinning cooling roll such that a patterned inner layer made of said first material is formed upon said spinning cooling roll, said patterned inner layer having a plurality of grooves which operate to form channels suitable for evacuation of gas from said vacuum packaging bag made of said multi-layer film, said plurality of grooves formed on said patterned inner layer in conjunction with a cooling of said first material; and feeding an outer layer onto said spinning cooling roll in conjunction with said extrusion and cooling of said first material such that said outer and inner layers laminate to form two layers of said multi-layer film, wherein said plurality of grooves are formed on a first surface of said patterned inner layer and a second surface of said patterned inner layer is laminated to said outer layer.

2. A method for manufacturing a multi-layer film as recited in claim 1, wherein the circumferential surface of said cooling roll is patterned whereby said plurality of grooves of said inner layer are inherently molded by the pattern on the circumferential surface of said cooling roll.

3. A method for manufacturing a multi-layer film as recited in claim 2, further including the act of controlling a temperature of said cooling roll in order to properly effectuate cooling and formation of said first material into said patterned inner layer.

4. A method for manufacturing a multi-layer film as recited in claim 2, further including the act of positioning a laminating roll to apply pressure to the outer layer and extruded material in order to apply said pattern formed on the circumferential surface of said cooling roll onto said multi-layer film.

5. A method for manufacturing a multi-layer film for use in vacuum packaging applications, said multi-layer film including an inner layer having a plurality of grooves which operate to form channels suitable for evacuation of gas when said multi-layer film is used in the creation of a vacuum packaging bag, said method comprising the acts of:

heat-extruding a heat-sealable material directly onto a spinning cooling roll having a uneven pattern such that an uneven patterned inner layer made of said heat-sealable material is formed upon said spinning cooling roll, said uneven patterned inner layer having a plurality of grooves which operate to form uneven channels suitable for evacuation of gas from said vacuum packaging bag made of said multi-layer film, said plurality of grooves formed on said patterned inner layer in conjunction with a cooling of said heat-sealable material;

feeding an outer layer onto said spinning cooling roll in conjunction with said extrusion and cooling of said heat-sealable material such that said outer and inner layers laminate to form two layers of said multi-layer film;

controlling a temperature of said cooling roll in order to properly effectuate cooling and formation of said heat-sealable material into said patterned inner layer; and positioning a laminating roll to apply pressure to the outer layer and extruded material in order to apply said uneven pattern formed on the circumferential surface of said cooling roll onto said multi-layer film.

\* \* \* \* \*